March 25, 1952 S. R. HOWARD ET AL 2,590,704
CHECK WEIGHING MACHINE
Filed Dec. 12, 1947 6 Sheets-Sheet 1

INVENTOR.
Stanley R. Howard
BY Robert William Vergobbi
J. Stanley Churchill
ATTORNEY INVENTOR.
Stanley R. Howard
BY Robert William Vergobbi
J. Stanley Churchill
ATTORNEY

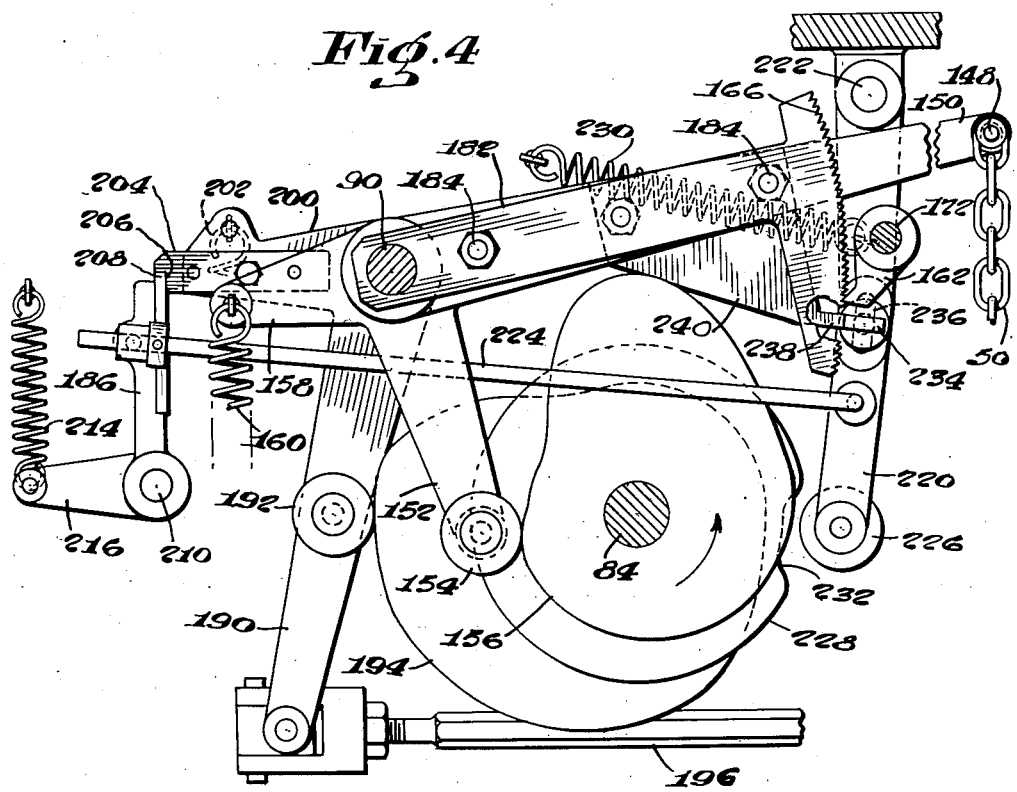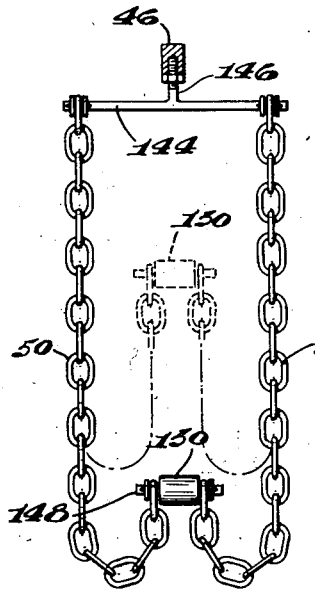

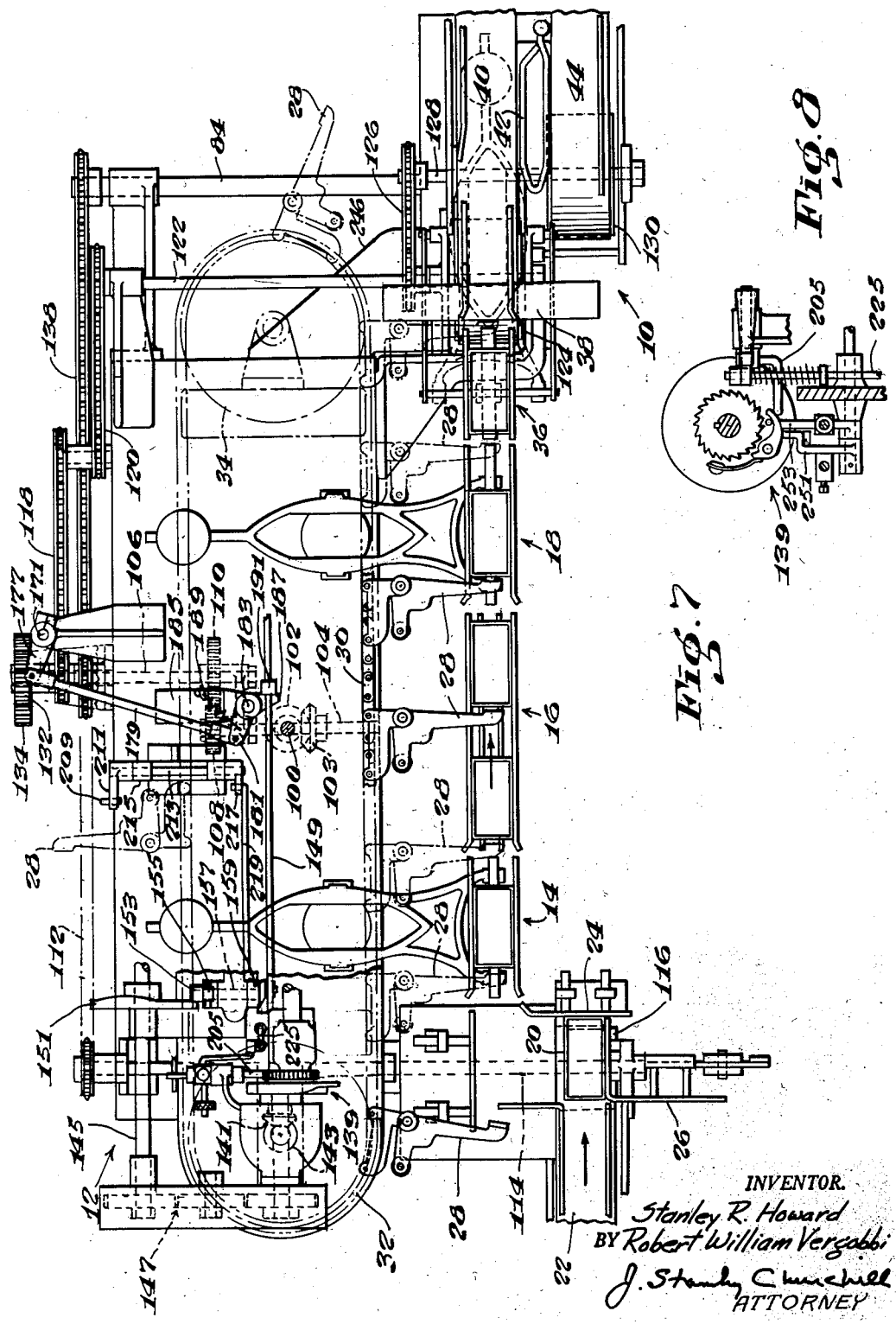

March 25, 1952  S. R. HOWARD ET AL  2,590,704
CHECK WEIGHING MACHINE
Filed Dec. 12, 1947  6 Sheets-Sheet 5
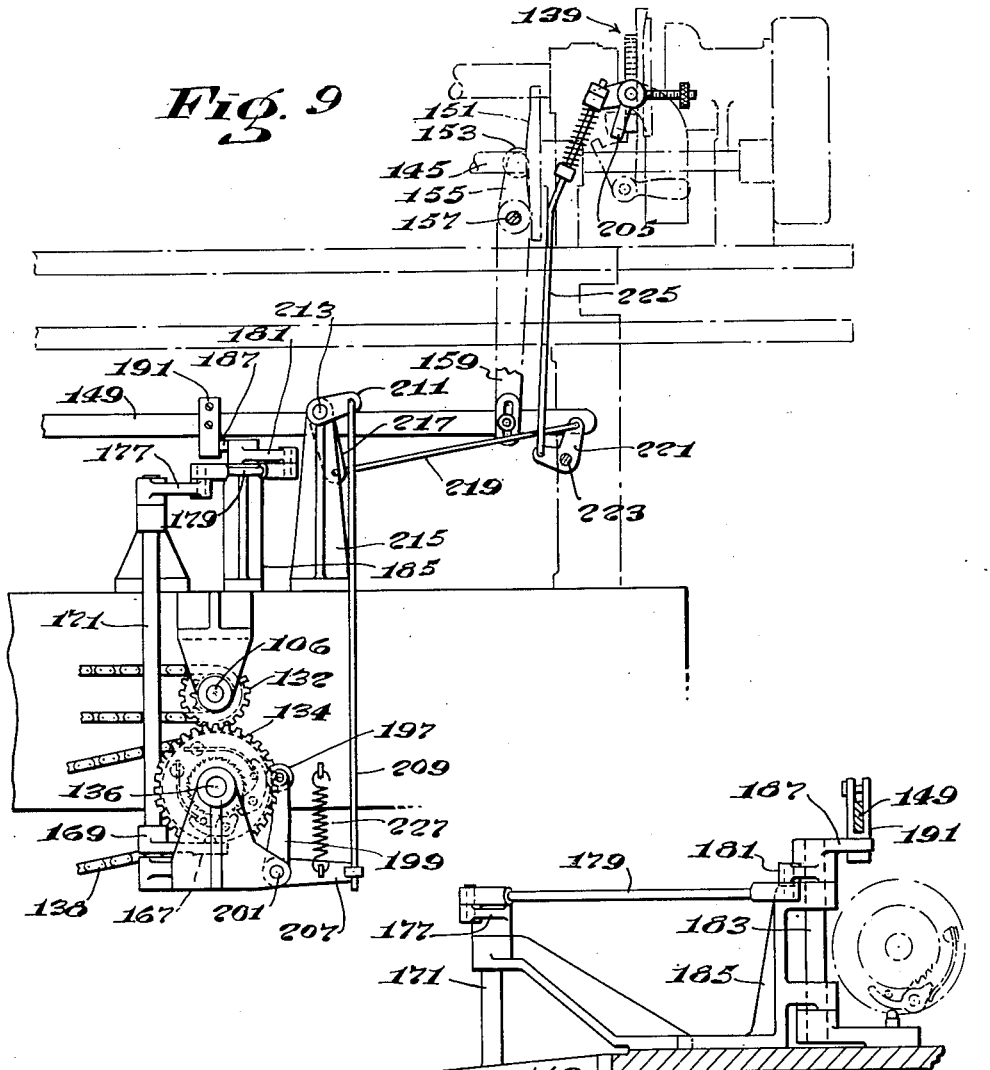
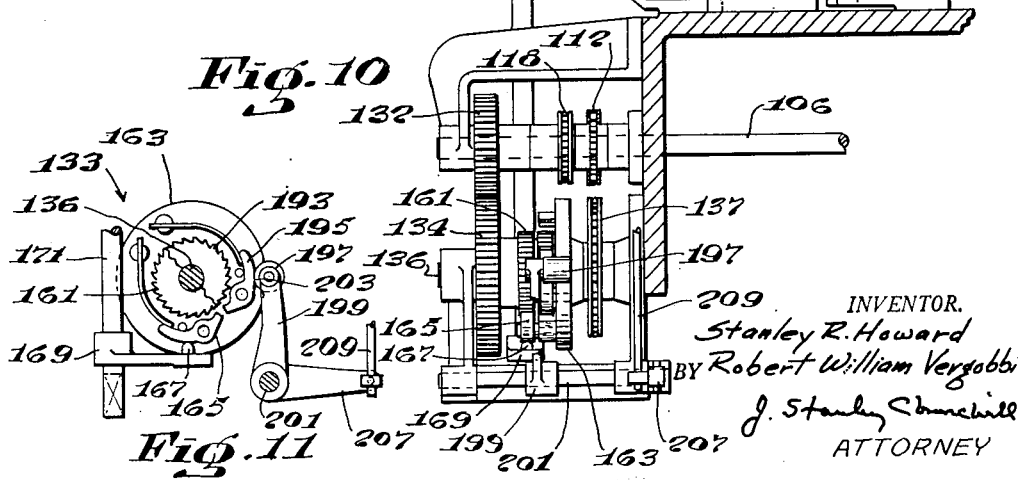
INVENTOR.
Stanley R. Howard
BY Robert William Vergobbi
J. Stanley Churchill
ATTORNEY March 25, 1952  S. R. HOWARD ET AL  2,590,704
CHECK WEIGHING MACHINE Filed Dec. 12, 1947  6 Sheets-Sheet 6

INVENTOR.
Stanley R. Howard
BY Robert William Vergobbi
J. Stanley Churchill
ATTORNEY Patented Mar. 25, 1952

2,590,704

UNITED STATES PATENT OFFICE 2,590,704

CHECK WEIGHING MACHINE

Stanley R. Howard, Milton, and Robert W. Vergobbi, Quincy, Mass., assignors to Pneumatic Scale Corporation, Limited, Quincy, Mass., a corporation of Massachusetts Application December 12, 1947, Serial No. 791,399

14 Claims. (Cl. 209—121)

This invention relates to a packaging machine, and more particularly to a weighing machine.

One object of the invention is to provide a novel and highly efficient machine for determining the weight of loads and preferably packages containing partial loads.

Another object of the invention is to provide a novel packaging machine having provision for checking the weights of filled packages and for selectively separating those packages whose weights vary from a predetermined standard of weight by more than an allowable tolerance.

A further object of the invention is to provide novel and improved check weighing apparatus adapted for use in checking the weights of filled packages delivered from a package filling or weighing machine and for rejecting those packages whose weights exceed or fall below a predetermined maximum and minimum tolerance of the correct weight.

With these objects in view and such others as may hereinafter appear, the invention consists in the packaging machine, in the weighing apparatus, and in the various structures, arrangements and combinations of parts hereinafter described and particularly defined in the claims at the end of this specification.

Figure 1:
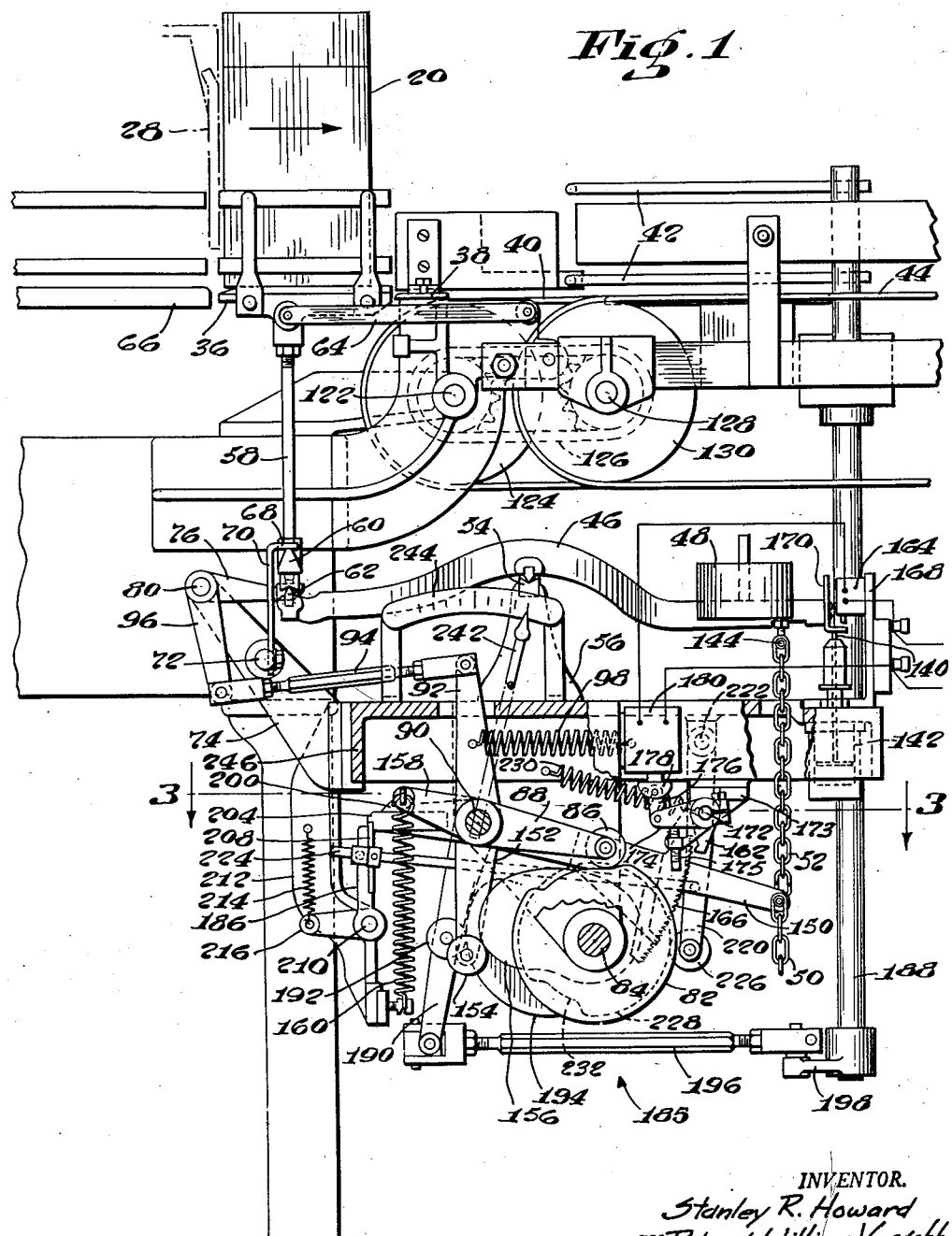
Figure 2:
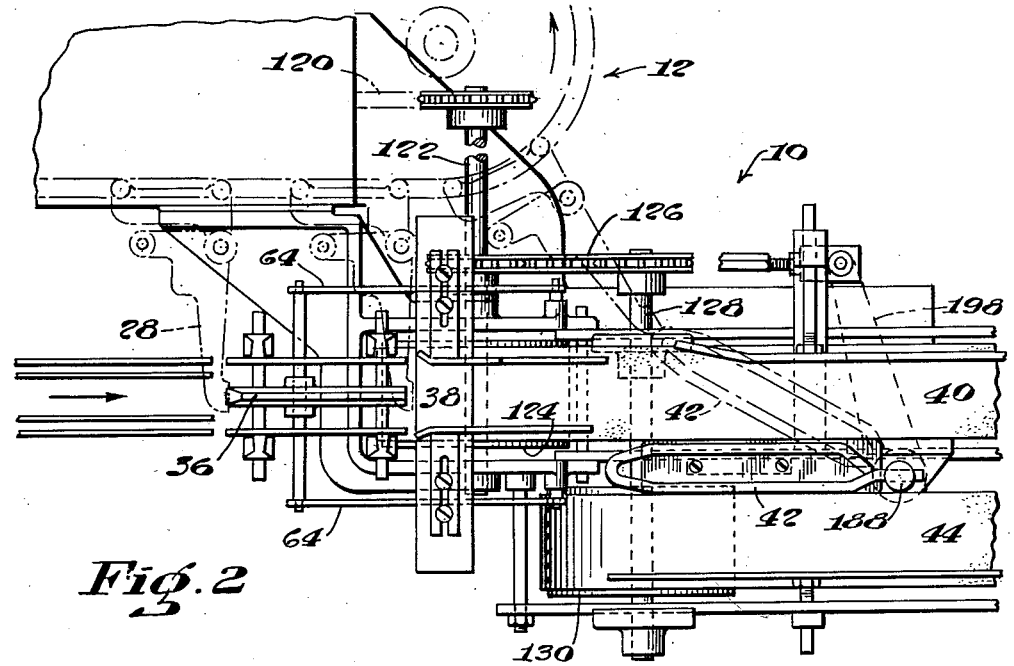
Figure 3:
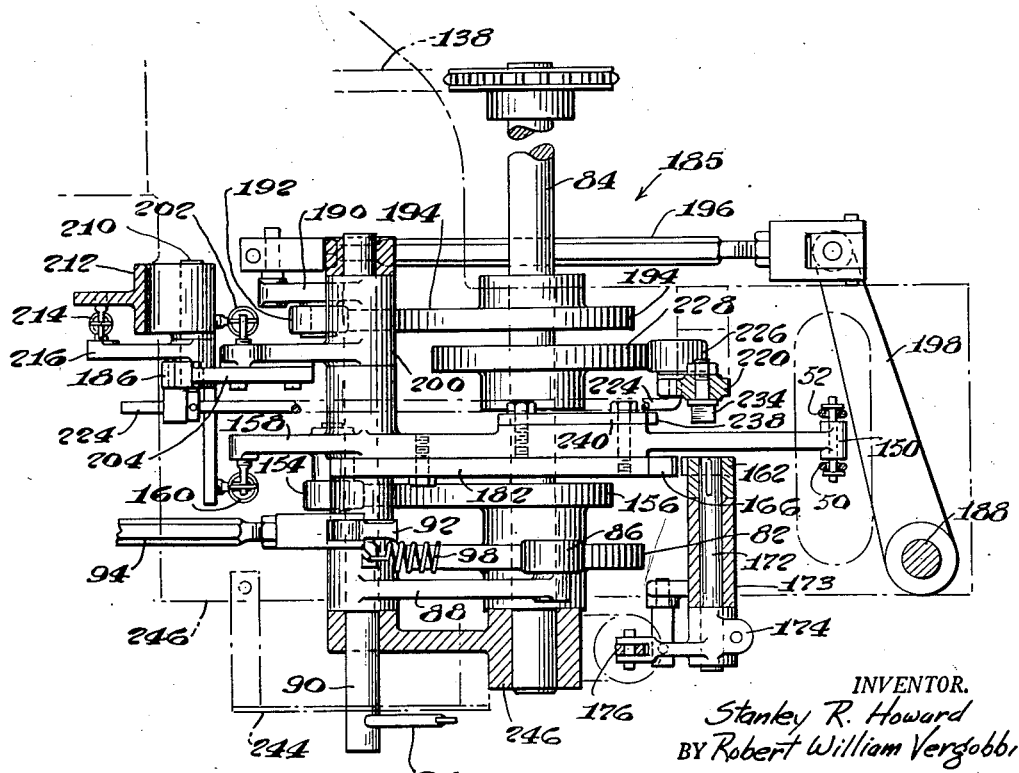
Figure 12:
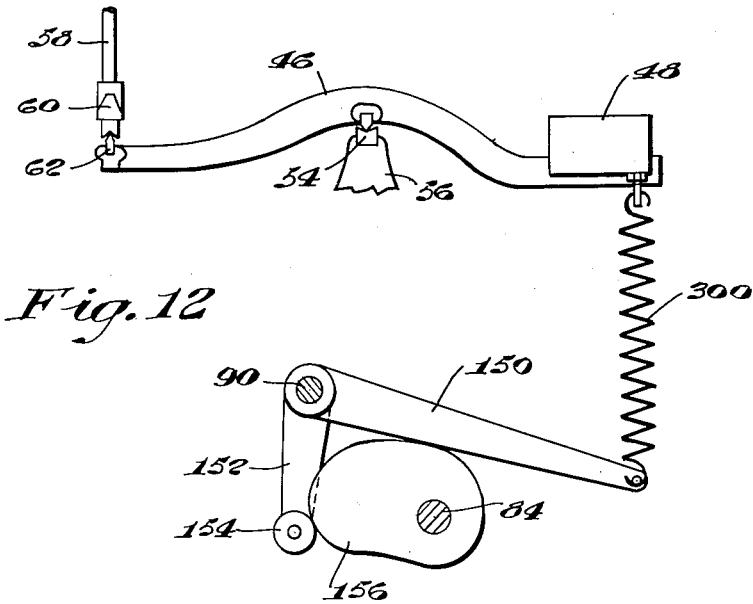
Figure 13:
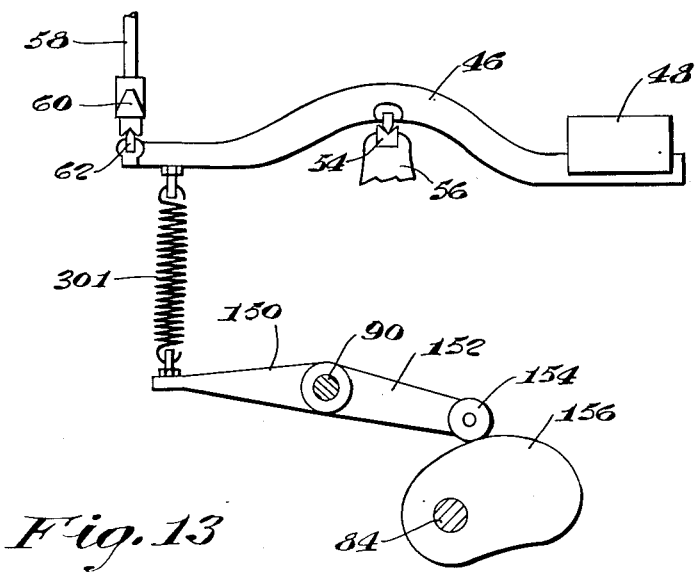

In the drawings illustrating the preferred embodiment of the invention, Fig. 1 is a front elevation of weighing apparatus embodying the present invention, portions thereof being broken away and shown in cross section; Fig. 2 is a sectional view of the apparatus shown in Fig. 1; Fig. 3 is plan view of the lower portion of the weighing apparatus as viewed from the line 3—3 of Fig. 1; Fig. 4 is an enlarged view of a portion of the apparatus shown in Fig. 1; Fig. 5 is a detail view of a variable counterweight mechanism embodied in the present apparatus, as viewed from the right in Fig. 1; Fig. 6 is a detail view of scale locking mechanism embodied in the present apparatus as viewed from the left in Fig. 1; Fig. 7 is a plan view of the lower portion of a two scale weighing machine embodying the present check weighing apparatus; Fig. 8 is a detail view of a one revolution clutch forming a part of the control for the two scale weighing machine; Fig. 9 is a view as seen from the rear of Fig. 7 showing the drive for the check weighing mechanism and the control mechanism for synchronizing the check weighing mechanism with the operation of the two scale weighing apparatus; Fig. 10 is a side elevation of the mechanism shown in Fig. 9; Fig. 11 is a detail view of a one revolution clutch comprising the driving element for the check weighing apparatus; and Figs. 12 and 13 are details to be referred to.

The invention in its broader aspects contemplates a weighing machine of novel construction, which may be used with advantage to determine the weight of a load or package in a simple, accurate and highly efficient manner. To this end the machine is provided with a movable scale beam upon which may be supported a load or a package comprising a container partially filled with a commodity. Provision is made for applying to the scale beam while overbalanced, and with the load or package supported thereon, a gradually increasing force to effect movement of the scale beam. The machine is further provided with means responsive to the movement of the scale beam for terminating the application of the aforesaid force whereby the point at which the application of such force is terminated may be utilized to indicate the weight of the load or package. Preferably the machine is provided with means controlled by such termination for separating those packages thus determined to deviate beyond definite limits from a predetermined weight. In practice the force application may be effected in various ways, as by modifying the effective counterweight, or by means of a spring, or equivalent means cooperating with the one end of the scale beam, or, if found advantageous, variables may be applied to both ends of a scale beam to accomplish this result.

In its preferred embodiment the present invention contemplates a novel check weighing mechanism for checking the weight of filled packages delivered thereto from a filling or weighing machine and in which provision is made for rejecting those packages whose weights vary beyond a fixed tolerance over or under a predetermined correct weight. The present check weighing mechanism may be incorporated as an integral part of a filling or weighing machine, or, may be used independently as a separate unit, and in practice, those packages found to be within the predetermined limits of the correct weight are permitted to follow one path along a conveyer to be delivered to other machines in the line for performing subsequent operations on the packages, and those packages found to exceed or fall short of such predetermined maximum and minimum weight limits are arranged to be diverted to another path from which the operator may remove the rejected packages and empty the contents into the weighing machine hopper whereupon the empty packages may be again delivered to the weighing machine.

Referring now to the drawings, in the illustrated embodiment of the invention, the present check weighing apparatus, indicated generally at 10, is shown as attached to and forming a part of a two-scale weighing machine, indicated generally at 12, Fig. 7, of the type illustrated and described in the United States Patent to Howard, No. 2,116,895 issued May 10, 1938. In such prior weighing machines, the packages are arranged to be intermittently moved in succession first to a primary or bulk weighing station 14 to receive a partial load of the material, then onto a vibratory platform or settling device 16, and then to a secondary or final weight station 18 where an additional amount of material is added to complete the weighing operation.

As illustrated herein, in operation, the empty cartons 20 are fed into the machine by a constantly driven inlet conveyer 22, the foremost carton thereon engaging a fixed stop 24. A pusher plate 26 is arranged to thereafter engage the first carton on the inlet conveyer and to push it into the path of a carrier arm 28, a plurality of which are attached in spaced relation to an intermittently driven endless chain 30 arranged to run over sprockets 32, 34 disposed at either end of the machine and driven in timed relation to the operation of the weighing mechanisms. As illustrated and described in the Howard patent above referred to, the machine is arranged to operate in successive cycles comprising a package moving cycle during which the cartons are advanced to successive stations of the weighing machine, and a weighing cycle during which the material is introduced into the carton and weighed, the cycles of operation being controlled by the operation of the weighing scales in a manner such that the package moving cycle cannot start until the scales have completed their weighing operations.

In accordance with the present invention the filled packages are arranged to be delivered from the weighing machine directly onto the platform or scale pan 36 of the check weighing scale, the filled packages being successively presented thereto by the intermittently moved carrier arms 28. Upon subsequent movement of the carrier arms 28, the check weighed package is moved across a bridge plate 38 and onto a continuously moving conveyer belt 40. In operation, if the package is of a correct weight or within the predetermined tolerances as determined by the check weighing mechanism, the package may continue its progress along the belt 40 to be discharged from the machine, or to be delivered to a subsequent machine for closing the top flaps of the carton. In the event that the package is found to deviate from the established tolerances over or under the predetermined standard weight, provision is made for rocking a rejecting gate 42 diagonally across the conveyer into the path of the package on the conveyor 40 whereby to divert the defective weight package onto a second conveyer belt 44 to discharge the rejected packages from the machine.

The inlet conveyer belt 22 and the discharge conveyer belts 40, 44 are preferably arranged to be continuously driven through connections from the weighing machine 12 and, as herein shown, the weighing machine is provided with a vertical drive shaft 100 having a bevel gear 102 at its lower end arranged to cooperate with a bevel gear 103 fast on a transverse shaft 104. The shaft 104 is geared to a second shaft 106 by spur gears 108, 110, the second shaft being connected by a chain and sprocket drive 112 to the conveyer drive shaft 114 on which the inlet conveyer pulley 116 is mounted for driving the conveyer belt 22. The discharge belts 40, 42 may be similarly driven through chain and sprocket connections 118, 120 from the transverse shaft 106 to the conveyer shaft 122 on which a discharge pulley 124 is mounted for driving the correct weight discharge belt 40, and, a chain and sprocket drive 126 connecting the shaft 122 to the conveyer shaft 128 on which a pulley 130 is mounted for driving the discharge belt 44 for the rejected packages.

Referring now particularly to Fig. 1, the present check weighing apparatus comprises a scale beam 46 having the scale pan 36 supported at one end thereof, an adjustable counterweight 48 supported at the other end, and a variable counterweight comprising a pair of chains 50, 52 suspended from the counterweight end of the scale beam, the other ends of the chains being arranged to be raised during the check weighing operation to gradually and progressively reduce the effective counterweight. As herein shown, the check scale beam 46 is supported on knife edge bearings 54 in a bracket 56 attached to the machine frame. The scale pan 36 is attached to the upper end of a vertical rod 58 which is provided at its lower end with a transverse bar 60 arranged to rest on knife edge bearings 62 carried by the scale beam 46. A parallel link 64 connected between the machine frame and the scale pan serves to support the latter for vertical movement.

Provision is preferably made for locking the scale pan 36 substantially in alignment with the package supporting rails 66 of the weighing machine during the package moving cycle of operation to prevent displacement of the scale beam 46 during the transfer of a filled package onto the scale pan. As herein shown, the scale pan is limited in its upward movement by laterally extended portion 68 of angle pieces 70 attached to either end of a rod 72 carried by a bracket 74 attached to the machine frame, the extended portions 68 being arranged to engage the upper surfaces of the transverse bar 60. A cooperating cam operated arm 76 is arranged to engage an extended end 78, Fig. 6, of the supporting rod 58 depending from the underside of the transverse bar 60 to maintain the scale pan in its upraised position during the package moving cycle. The scale pan locking arm 76 is fixed to a shaft 80 mounted in the bracket 74 and is arranged to be rocked into and out of locking position by a cam 82 fast on a cam shaft 84 and through connections including a cam roll 86 cooperating with the cam and carried by one arm 88 of a two-armed lever pivotally mounted on a rocker shaft 90. The second arm 92 of the two-armed lever is connected by a link 94 to an arm 96 fast on the pivot shaft 80. A spring 98 connected to the arm 92 is arranged to urge the linkage into locking position when permitted to do so by the cam 82.

As illustrated in Fig. 7, the cam shaft 84 is arranged to be driven from and in timed relation to the weighing machine 12 through connections from the transverse shaft 106 including a pinion 132 fast on the end of shaft 106 and a cooperating gear 134 mounted on a lower shaft 136, (Fig. 10) the gear 134 forming the driving member of a one revolution clutch, indicated generally at 133, for synchronizing the operation of the check weighing mechanism with the weighing machine, as will be hereinafter more fully described. A sprocket 137 also mounted on the shaft 136 and arranged to rotate with the driven member of the one revolution clutch 133 is connected by a chain and sprocket drive 138 to the cam shaft 84.

From the description thus far it will be seen that in operation, a filled package is deposited upon the check weighing scale at the end of the package moving cycle of operation whereupon the locking arm 76 is rocked to unlock the scale and to permit the scale beam to take the weight of the scale pan and the filled package resting thereon. In practice, the counterweights including the adjustable counterweight 48 and the variable counterweight chains 50, 52 are initially adjusted and arranged to overbalance a package approximating the predetermined correct weight, the counterweight end of the scale beam normally bearing against the upper end of a stop rod 140 extending from and operatively connected to a dash pot 142.

Provision is now made for gradually lifting the lower ends of the chains 50, 52 to reduce the effective counterweight until the scale balances. As shown in detail in Fig. 5, the upper ends of the chains are suspended from the ends of a transverse rod 144 connected medially of its length to the scale beam 46 by an upstanding threaded portion 146. The lower ends of the chains are looped upwardly and hooked over opposite ends of a pin 148 carried by the end of a cam operated counterweight reducing lever 150. The lever 150 is fast on the rocker shaft 90 and froms part of a three-armed lever including an arm 152 carrying a roller 154 for cooperation with a cam 156 fast on the cam shaft 84, and an arm 158 connected to a spring 160 arranged to rockingly urge the counterweight reducing lever 150 upwardly when permitted to do so by the cam 156. During the check weighing operation the counterweight reducing lever 150 is gradually rocked upwardly to progressively relieve the scale beam of a portion of the weight of the variable counterweight chains 50, 52, and when the weight of the package being check weighed overbalances the counterweights, the counterweight end of the scale beam is rocked upwardly.

In the preferred embodiment of the invention, provision is made for terminating the upward rocking movement of the counterweight reducing lever 150 immediately upon balancing of the scale beam 46 as effected by the reduction of the effective counterweight and, as herein shown, termination of the upward rocking movement of the lever is arranged to be controlled by the scale beam by the provision of a solenoid operated pawl 162 arranged to be actuated upon closing of a switch 164 when the scale beam balances, and, a ratchet segment 166 carried by the lever 150 and arranged to be engaged by the pawl 162 when the solenoid is energized. As illustrated in Fig. 1, the switch 164 is mounted on a bracket 168 attached to the machine frame and is arranged to be closed by the engagement of an angle piece 170 attached to the end of the scale beam. As better shown in Fig. 3, the pawl 162 is keyed to the end of a rocker shaft 172 journaled in a bracket 173 attached to the underside of the machine frame, and, an arm 174 clamped to the other end of the shaft is connected by a link 176 to the armature 178 of the solenoid 180. The arm 174 is arranged to bear against an adjustable stop screw 175 carried by the bracket 173 for adjusting the position of the pawl 162 relative to the ratchet segment 166. The ratchet segment is formed on the outer end of an arm 182 fitted on the rocker shaft 90 and secured to be movable with the lever 150 by bolts 184.

With this construction it will be seen that the arcuate movement of the counterweight reducing lever 150 is directly proportional to and indicative of the weight of the package being check weighed so that in practice the lever will be stopped in substantially the same position herein termed an intermediate position, for each correct weight package, and will be stopped above or below such intermediate position for each over or underweight package respectively. For example, if the package is overweight, only a small amount of counterweight reduction is required, the scale will balance prematurely, and the lever will be stopped during its initial movement or after it has passed through a relatively small arc. Should the package be underweight, more counterweight reduction is required so that the lever will travel through a relatively wide arc before the scale balances to effect termination of the upward rocking movement of the lever.

In accordance with the present invention provision is made for rejecting those packages found to be over or under the established correct weight tolerances as determined by the position at which the counterweight reducing lever 150 is stopped upon balancing of the scale beam, and, for rendering the rejecting mechanism inoperative when the package being check weighed is found to be within the predetermined tolerances. As herein shown, the rejecting mechanism comprises a cam operated linkage, indicated generally at 185 which is normally maintained in an inoperative position by a latch arm 186 and arranged to be released when a defective package is detected to effect rocking of a vertical shaft 188 upon which the rejecting gate 42 is mounted. The rejecting mechanism linkage 184 includes a cam lever 190 pivotally mounted on the rocker shaft 90 and having a cam roller 192 mounted between the ends of the lever for cooperation with a cam 194 fast on the cam shaft 84. The outer end of the cam lever 190 is connected by a link 196 to an arm 198 fast on the lower end of the vertical shaft 188. A second arm 200 formed integrally with the cam lever 190 is connected by a spring 202 arranged to urge the linkage 185 in a direction to rock the rejecting gate 42 to a diverting position when permitted to do so by the cam 194 and by release of the latch member 186.

As herein shown, the arm 200 is provided with an extension 204 having a notch 206 for cooperation with the end 208 of the latch arm 186. The latch arm 186 is pivotally mounted at 210 in a bracket 212 attached to the machine frame, and, a spring 214 connected to a second arm 216 of the latch member is arranged to urge the latch in a clockwise direction into engagement with the notch 206 as shown in Figs. 1 and 4.

As best shown in Fig. 4, the mechanism for releasing the latch arm 186 to effect diversion of a defective package onto the rejecting conveyer 44 comprises a cam operated feeler arm 220 pivotally mounted at 222 and connected to the latch arm 186 by a link 224. The arm 220 is provided with a cam roll 226 for cooperation with a cam 228 fast on the cam shaft 84, and, a spring 230 is arranged to urge the feeler arm in a clockwise direction to follow the cam 228. The cam 228 is designed to hold the feeler arm 220 in a position to maintain the latch 208 in engagement with the notch 206 during the check weighing operation, and, when a sufficient time has elapsed for the check weighing operation to be completed and the counterweight reducing lever 150 brought to rest, the arm 229 is permitted to be rocked clockwise to release the latch when a defective weight package is detected by the provision of a low spot or cut-out portion 232 of the cam.

The feeler arm 220 is arranged to cooperate with the counterweight reducing lever 150 to prevent release of the latch member 186 when the package is found to be of a weight within the predetermined tolerances, and, as herein shown, the feeler arm 220 is provided with a stop member 234 adjustably mounted in a slotted portion 236 of the arm. The stop member 234 is arranged to engage an abutment 238 carried by the counterweight reducing lever 150 when the latter is brought to rest in an intermediate position, indicating that the weight of the package is within the predetermined tolerance. The abutment 238 comprises an extended portion of a plate member 240 secured to the lever 150 by the bolts 184.

Since the extent of arcuate movement of the lever 150, or the rocker shaft 90 to which the lever is fixed is related to and indicative of the weight of the package being check weighed, the rocker shaft 90 may be provided with a dial arm or pointer 242 fixed thereto and arranged to cooperate with a graduated arcuate dial 244, as illustrated in Fig. 1. The dial 244 may and preferably will be disposed in a convenient position above the supporting bracket 246 of the check weighing mechanism to enable the operator to note the condition of the package being check weighed and determine whether successive packages are running over or under weight so that he may make the necessary adjustments on the weighing machine.

From the above description it will be seen that in the operation of the machine when a package having substantially the correct weight is placed on the scale pan and the scale is unlocked, the counterweight reducing lever 150 is rocked upwardly by the spring 160 as permitted by the cam 156 to reduce the effective counterweight until the scale is balanced whereupon the solenoid operated pawl 162 is actuated to engage the ratchet segment 166 and bring the lever 150 to rest. When the check weighing operation is completed the low spot 232 of the cam 228 has arrived in a position confronting the roller 226 to permit the feeler arm 220 to be rocked to the left by the spring 230, and, if the package is found to be of substantially the correct weight the movement of the feeler arm 220 will be interrupted by engagement of the stop lug 234 with the abutment 238 to prevent release of the latch 186 and the package will be permitted to continue along the correct weight package belt 40. However, in the event that the lever 150 is stopped to present the abutment 238 above or below the stop lug 234, indicating that the package is under or over weight, the feeler arm 220 is permitted to rock to the left and correspondingly move the link 224 to the left to release the latch mechanism 186 and effect diversion of the defective weight package onto the rejecting conveyer belt 44 as described hereinbefore. At the time that the low spot 232 of the cam 228 is opposite the roller 226 on the feeler arm 220, the roller 154 on the arm 152 of the counterweight reducing lever 150 is engaged with a low portion of the cam 156 which decreases in radius as the cam 156 rotates counter-clockwise. Once the pawl 162 has engaged with the segment 166, the spring 160 is ineffective to cause further rocking of the lever 150 even though the contour of the cam 156 would otherwise permit such movement. Furthermore, after the check weighed package has been moved off the scale pan 36, counterweight 48 will rock the beam 46 and return the angle piece 170 to its initial position in engagement with the stop rod 140. Such movement of the scale beam will permit the switch 164 to open and deenergize the solenoid 180 to effect disengagement of the pawl 162 from the segment 166 to free the lever 150 for the next check weighing operation.

As above stated, provision is made for synchronizing the operation of the check weighing apparatus with the two scale weighing machine through the provision of a one revolution pawl and ratchet clutch 133, Fig. 11, forming a part of the driving mechanism to the check weighing cam shaft 84. As fully illustrated and described in the Howard Patent No. 2,116,895 above referred to, the weighing machine is arranged to be operated in successive cycles comprising a weighing cycle and a package moving cycle through the provision of a one revolution clutch, indicated generally herein at 139, Figs. 7 and 8, controlled by the weighing scales in a manner such as to prevent initiation of the package moving cycle by means of pawl stops 251, 253, until the scales have completed their weights. The one revolution clutch 139 is arranged to drive the carrier chain 30 through connections including the bevel gears 141, 143. Provision is also made for driving a control shaft 145 during the package moving cycle through connections including a gear train 147. The control shaft 145 is arranged to operate a resetting bar 149, Figs. 1, 9 and 10 at the end of the package moving cycle through connections including a cam 151 fast on the shaft 145 and a cooperating roller 153 carried by an arm 155 fast on a pin 157. A second arm 159 also fast on the pin 157 is connected at its lower end to the resetting bar 149. Thus, in the operation of the machine, the resetting bar is moved to the left, viewing Fig. 7, to reset the scales and associated mechanisms, at the end of the package moving cycle of operation, as more fully described in the Howard Patent No. 2,116,895.

Accordingly, provision is made for controlling the one revolution clutch 133 for the check weighing drive by the movement of the resetting bar at the end of the package moving cycle so as to start the check weighing operation immediately after a weighed package has been transferred onto the check weighing scale pan 36. As herein shown, the driving element 134 for the one revolution pawl and ratchet clutch 133 is loosely mounted on the shaft 136 and is provided with a ratchet 161 formed integrally therewith. A carrier disc 163 comprising the driven member of the clutch is keyed to the shaft 136 and is provided with a spring-pressed pawl 165 for cooperation with the ratchet 161. The driving sprocket 137 is also keyed to the shaft 136.

As shown in Figs. 9, 10 and 11, a pawl stop 167 is normally arranged in the path of the pawl 165 to effect disengagement thereof from its ratchet 161. The pawl stop 167 is carried by an arm 169 fast on the lower end of a vertical shaft 171. The upper end of the vertical shaft 171 is provided with an arm 177 also fast thereon and connetced by a link 179 to an arm 181 fast on a vertical shaft 183 supported in a bracket 185. The arm 181 is formed integrally with an extension 187 normally urged in a clockwise direction, viewing Fig. 7, by a spring 189 and arranged to be engaged by an adjustable pin 191 clamped to the resetting bar 149. Thus, at the end of the package moving cycle of operation when the resetting bar 149 is moved to effect rocking of the linkage described, the pawl stop arm 169 is rocked out of the path of the pawl 165 to permit it to engage the ratchet 161, the pawl stop being subsequently returned into the path of the pawl by the spring 189 to disengage the pawl and to bring the driven member to rest at the end of one revolution.

A second ratchet 193 carried by the gear 134, and opposed to the ratchet 161 is arranged to cooperate with a second spring-pressed pawl 195 to prevent the driven member or pawl carrier disc 163 from rotating or coasting ahead of the driving gear 134 during operative engagement of the clutch to thus effect a positive driving connection. A roller 197 carried by an arm 199 fast on a rocker shaft 201 is arranged to cooperate with a cut-out portion 203 of the pawl carrier disc 163 to bring the driven member to rest in a predetermined position at the end of each cycle, and, the tail of the pawl 195 is arranged to be simultaneously engaged by the roller 197 to effect disengagement of the pawl from its ratchet 193.

Provision is further made in the illustrated embodiment of the invention for preventing initiation of the package moving cycle of operation until the check weighing apparatus has completed its cycle, that is, when the driven member 163 of the clutch has completed its one revolution and come to rest. This is accomplished by the provision of an additional pawl stop 205 (Fig. 9) for the one revolution clutch 139 arranged to be controlled through connections from the one revolution clutch 133 in a manner such as to effect withdrawal of the pawl stop 205 when the driven member 163 comes to rest. As herein shown, the rocker shaft 201 is provided with a second arm 207 fast thereon connected to the pawl stop 205 through linkage including a rod 209 connected to an arm 211 fast on a rocker shaft 213 journaled in a bracket 215. An arm 217 also fast on the shaft 213 is connected by a link 219 to a bell-crank 221 pivotally mounted at 223. The second arm of the bell-crank is connected by a yieldable link 225 to the pivotally moutned pawl stop 205. A spring 227 connected to the arm 207 is arranged to urge the roller 197 on the arm 199 into engagement with the pawl carrier disc 163, the disc being arranged to hold the linkage in a position to maintain the one revolution clutch 139 disengaged until the disc 163 comes to rest whereupon the roller 197 will fall into the cut-out 203 thus effecting rocking of the linkage and withdrawal of the pawl stop 205 at the end of the check weighing cycle of operation.

From the foregoing description, it will be observed that in its various embodiments the invention contemplates a novel weighing machine wherein a gradually varying force is applied to a scale beam initially arranged to assume one position with the load or package supported thereon, so as to effect movement of the beam. The machine is provided with means controlled by such movement of the scale beam for terminating the application of such force whereby the point at which the application of such force is terminated as determined by the position of an element of the means for effecting the termination may be utilized to determine the weight of the load or package. As above pointed out, the scale beam may be subjected to gradually increasing or decreasing forces produced in various ways applied to one or both ends of the beam and in the preferred embodiment of the invention the permitted tolerances are determined by the position of a part of the mechanism employed in terminating the application of the force, and the package separation is arranged to be controlled thereby. The invention finds particular use as a check weighing apparatus for separating out those packages found to vary from a predetermined weight by more than permitted tolerances.

As above pointed out the mechanism for applying a gradually increasing force to the scale beam to effect its movement from an initial overbalanced position, in which the load or package to be weighed is supported thereon, in addition to a means for reducing the effective counterweight, may include suitable means for applying a force to either end of the scale beam, and also suitable means for applying variable forces to both ends of the scale beam for accomplishing this result. As shown in detail in Fig. 12, the counterweight end of the scale beam 46 may be connected by a spring 300 to the counterweight reducing lever 150, and as shown in Fig. 13 the counterweight reducing lever 150 may be extended beyond its pivot and a spring 301 arranged to connect the extended end to the package supporting end of the scale beam to increase the force on the scale beam to overcome the effect of the counterweight 48. In both instances the springs 300, 301 serve instead of the flexible chain 52 to accomplish the desired result.

While the preferred embodiment of the invention has been herein illustrated and described it will be understood that the invention may be embodied in other forms within the scope of the following claims.

Having thus described the invention, what is claimed is:

1. Weighing mechanism comprising in combination, a scale beam, counterweight means for said scale beam sufficient to initially overbalance a package approximating a predetermined weight, independently movable means for applying a gradually increasing force to overcome the overbalance of the counterweight means to thereby effect movement of the scale beam to a balanced position, means responsive to the movement of the scale beam to said balanced position to effect termination of the movement of said force applying means, and package rejecting means controlled in accordance with the position occupied by said force applying means at the time its movement is terminated for effecting rejection of a package found to deviate beyond definite limits from said predetermined weight.

2. Weighing mechanism comprising, in combination, a scale beam, a counterweight for said scale beam initially sufficient to overbalance a package approximating a predetermined weight, independently movable means for reducing the effective counterweight to effect movement of the scale beam to balanced position, means responsive to the movement of the scale beam to said balanced position for terminating the operation of said counterweight reducing means, package rejecting means, and control means arranged to cooperate with said counterweight reducing means in the position in which its movement has been terminated for rendering the package rejecting means inoperative when the check weighed package is found to be within definite limits of said predetermined weight and for permitting operation of said rejecting means when the weighed package is found to deviate beyond said limits.

3. Weighing mechanism comprising, in combination, a scale beam, a variable counterweight for said scale beam comprising a flexible member suspended from the counterweight end of the scale beam and initially sufficient to overbalance a package approximating a predetermined weight placed on the weighing end of the scale beam, independently movable means for gradually and progressively reducing the effective counterweight during the weighing operation to effect movement of the scale beam to balanced position and including means for raising the suspended end of said flexible member, means responsive to the movement of the scale beam to balanced position to effect termination of movement of said counterweight reducing means, and package rejecting means cooperable with said counterweight reducing means and controlled in its operaation in accordance with the position occupied by said counterweight reducing means at the time that its movement is terminated, for effecting rejection of a package found to deviate beyond predetermined limits from said predetermined weight.

4. Weighing mechanism comprising, in combination, a scale beam, a variable counterweight for said scale beam comprising a flexible member suspended from the counterweight end of the scale beam and initially sufficient to overbalance a package approximating a predetermined weight placed on the weighing end of the scale beam, means including a movable member arranged to gradually and progressively lift the suspended end of the flexible counterweight for reducing the effective counterweight during the check weighing operation and to effect movement of the scale beam, means responsive to the movement of the scale beam adapted to effect termination of movement of said counterweight reducing member, the movement of the counterweight reducing means being related to the reduction in effective counterweight whereby the position of termination of movement of said member is indicative of the weight of the package being check weighed, termination of movement of said member in an intermediate position being indicative of a package having a weight within allowable tolerances of said predetermined weight, and package rejecting means including a control means arranged to cooperate with said counterweight reducing member in its terminated position for effecting rejection of a package when the counterweight reducing member is terminated in a position above or below said intermediate position.

5. Weighing mechanism comprising, in combination, a scale beam, a counterweight comprising a flexible member suspended from the scale beam and initially arranged to overbalance a package approximating a predetermined weight, counterweight reducing means including a cam operated lever operatively connected to the suspended end of said flexible counterweight and arranged to gradually and progressively raise the suspended end during the weighing operation to effect balancing of the scale beam, a ratchet segment carried by said lever, means including a solenoid operated pawl responsive to the movement of the scale beam and engageable with said ratchet segment to effect termination of said counterweight reducing means when the scale has balanced, and package rejecting means controlled by the position of termination of said counterweight reducing means for effecting rejection of a package found to deviate from said predetermined weight by more than a definite amount.

6. Weighing mechanism comprising, in combination, a scale beam, a variable counterweight initially arranged to overbalance a package approximating a predetermined weight, means for reducing the effective counterweight to effect movement of the scale beam, means responsive to the movement of the scale beam adapted to effect termination of said counterweight reducing means, package rejecting means, and control means including a latch normally arranged in locking engagement with said rejecting means, and a detecting arm operatively connected to the latch and arranged to cooperate with said counterweight reducing means in its position of termination to permit release of said latch and operation of said rejecting mechanism when a package is found to deviate by more than allowable tolerances from said predetermined weight.

7. Weighing mechanism comprising, in combination, a scale beam, a flexible counterweight suspended from said scale beam and initially arranged to overbalance a package approximating a predetermined weight, counterweight reducing means including means operatively connected to the suspended end of said flexible counterweight arranged to gradually and progressively lift the suspended end of said flexible counterweight during the weighing operation to effect movement of the scale beam, means responsive to the movement of the scale beam adapted to effect termination of said lifting movement when the scale has moved, package rejecting means, and control means including a latch normally arranged in locking engagement with said rejecting means, and a detecting arm operatively connected to the latch and arranged to cooperate with said counterweight reducing means in its position of termination to permit release of said latch and operation of the rejecting mechanism when a package is found to deviate by more than allowable tolerances from said predetermined weight.

8. In a packaging machine, in combination, check weighing mechanism comprising a scale, a flexible counterweight suspended at one end from said scale initially arranged to overbalance a package approximating a predetermined weight, movable counterweight reducing means including means operatively connected to the suspended end of the flexible counterweight arranged to gradually move and reduce the effective counterweight to effect balancing of the scale beam, package rejecting means for rejecting over and under-weight packages, and control means including a member arranged to detect the position of said counterweight reducing means at the time that the scale beam moves to balanced position to render said package rejecting means operative or inoperative in accordance with the weight of the package as indicated by the position of said counterweight reducing means when the scale beam reaches balanced position.

9. In a packaging machine, in combination, check weighing mechanism comprising a scale, a counterweight for said scale initially arranged to overbalance a package approximating a predetermined weight, movable means for applying a gradually increasing force to the scale beam to effect movement of the scale beam to a balanced position, package rejecting means for rejecting over and under-weight packages, control means including a detecting member arranged to cooperate with said force applying means when said scale beam is balanced for rendering said rejecting means operative or inoperative in accordance with the weight of the package as indicated by the position occupied by the force applying means at the time that the scale beam is moved to balanced position, and package moving means for intermittently transferring successive packages onto the weighing scale operable in timed relation to the operation of said check weighing mechanism.

10. In a packaging machine, in combination, check weighing mechanism comprising a scale, a flexible counterweight suspended from said scale initially arranged to overbalance a package approximating a predetermined weight, counterweight reducing means including means operatively connected to the suspended end of the flexible counterweight arranged to gradually reduce the effective counterweight to effect movement of the scale beam, package rejecting means, control means arranged to cooperate with said counterweight reducing means for rendering said rejecting means operative or inoperative in accordance with the checked weight of the package as indicated by the position of termination of said counterweight reducing means, package moving means for intermittently transferring successive packages onto the check weighing scale, and scale locking mechanism for maintaining the scale stationary during the package transfer operation.

11. In a packaging machine, in combination, check weighing mechanism comprising a scale, counterweighted to initially overbalance a package supported thereon approximating a predetermined weight, movable means for applying a gradually increasing force to effect movement of the scale beam to balanced position, package rejecting means operative to reject over and under-weight packages, control means for rendering said rejecting means operative or inoperative in accordance with the checked weight of a package as indicated by the position of said movable means when said beam is in balanced position, package moving means for intermittently transferring successive packages onto the scale and scale locking means for maintaining the scale beam stationary during such transfer.

12. In a packaging machine operative in successive cycles including a weighing cycle and a package moving cycle, in combination, check weighing mechanism comprising a scale beam, a counterweight for said scale beam initially arranged to overbalance a package approximating predetermined weight, movable means for applying a gradually increasing force to effect movement of the scale beam, means responsive to the movement of the scale beam balanced position to effect termination of the movement of said force applying means, package rejecting means controlled in its rejecting operation by the final position of said force applying means for effecting rejecting of a package found to deviate substantially from said predetermined weight, and control means operatively connected to the packaging machine for preventing initiation of the check weighing operation until the packaging machine has completed its package moving cycle of operation.

13. In a package machine operative in successive cycles including a weighing cycle and a package moving cycle, in combination, check weighing mechanism comprising a scale beam, variable counterweight for said scale beam initially arranged to overbalance a package approximating a predetermined weight, movable means for gradually reducing the effective counterweight to effect movement of the scale beam to balanced position, means responsive to the movement of the scale beam to balanced position to effect termination of movement of said counterweight reducing means, package rejecting means controlled in its rejecting operation by the final position of said counterweight reducing means for effecting rejection of a package found to deviate by more than allowable tolerances from said predetermined weight, and control means operatively connected to said check weighing mechanism for preventing initiation of the package moving cycle of operation of the packaging machine until the check weighing mechanism has completed its cycle of operation.

14. Weighing mechanism comprising in combination, a scale beam, counterweight means for said scale beam sufficient to intitially overbalance a package approximating a predetermined weight, means operable to apply a gradually varying force effective on said scale beam to overcome the overbalance of said counterweight means and thereby allow movement of said scale beam to a balanced position, said last-mentioned means including a member movable in proportion to the amount of force required to overcome the overbalance of said counterweight means for the weight of the particular package being weighed, means actuated in response to the movement of said scale beam to balanced position for terminating movement of said movable member in the position thereof corresponding to the balanced position of said scale beam, package rejecting means operative to reject over and under-weight packages, and control means cooperable with said movable member and actuatable to render said package rejecting means operative or inoperative in accordance with the weight of the package as indicated by the position of said movable member at the time its movement was terminated.

STANLEY R. HOWARD.
ROBERT W. VERGOBBI.

REFERENCES CITED

The following references are of record in the file of this patent:

UNITED STATES PATENTS

| Number | Name | Date |
| --- | --- | --- |
| 1,729,320 | Anderson | Sept. 24, 1929 |
| 2,066,763 | Bryce | Jan. 5, 1937 |
| 2,116,895 | Howard | May 10, 1938 |
| 2,112,823 | Breuiln | Apr. 5, 1938 |